(12) United States Patent
Koizumi

(10) Patent No.: US 6,738,192 B2
(45) Date of Patent: May 18, 2004

(54) BOOSTER LENS FOR A MICROSCOPE

(75) Inventor: David H. Koizumi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/271,335

(22) Filed: Oct. 15, 2002

(65) Prior Publication Data

US 2003/0086162 A1 May 8, 2003

Related U.S. Application Data

(63) Continuation of application No. 09/666,764, filed on Sep. 21, 2000, now abandoned.

(51) Int. Cl.$^7$ .......................... G02B 21/00; G02B 7/02; G02B 27/02

(52) U.S. Cl. .................. 359/381; 359/811; 359/802

(58) Field of Search .................. 359/381, 811, 359/802–803, 656–661, 672, 673, 675, 219

(56) References Cited

U.S. PATENT DOCUMENTS

| 3,551,021 A | 12/1970 | Straat .................. 359/368 |
| 3,915,560 A | 10/1975 | Levine et al. ........... 359/824 |
| 5,168,405 A | * 12/1992 | Feinbloom ............. 359/802 |
| 5,430,506 A | 7/1995 | Volk .................... 351/205 |
| 5,526,074 A | 6/1996 | Volk .................... 351/219 |
| 6,120,147 A | * 9/2000 | Vijfvinkel et al. ...... 351/160 R |
| 6,212,006 B1 | * 4/2001 | Reiner .................. 359/388 |

FOREIGN PATENT DOCUMENTS

| GB | 871488 | 6/1961 |
| JP | 10 170832 A | 6/1998 |
| NL | 76 797 C | 12/1954 |

* cited by examiner

*Primary Examiner*—Ricky Mack
*Assistant Examiner*—William Choi
(74) *Attorney, Agent, or Firm*—Trop, Pruner & Hu, P.C.

(57) ABSTRACT

A booster lens may be used with a conventional or electronic microscope by positioning the booster lens on top of a specimen holder. With limited or no additional focusing, greater magnification may be achieved by augmenting the magnification possible with the optics available with the microscope itself.

3 Claims, 2 Drawing Sheets

BOOSTER LENS FOR A MICROSCOPE

This is a continuation of U.S. patent application Ser. No.09/666,764, entitled, now abandoned "BOOSTER LENS FOR A MICROSCOPE," filed on Sep. 21, 2000.

BACKGROUND

This invention relates generally to microscopes.

Microscopes are made with a variety of magnification levels. While ultimately it may be desirable to provide the greatest possible magnification for each microscope, different users may be amenable to different pricing structures. Therefore, microscopes are provided with a variety of different magnification levels.

In some cases, a particular microscope may have a number of desirable features but its magnification levels may otherwise be unsuitable for specific applications. The manufacturer of the microscope may prefer not to include optics to achieve a particular magnification level because including such optics may increase the price that all customers must pay. Particularly, where all users would not be interested in the relatively higher degree of magnification, the manufacturer may be unwilling to include extended magnification levels. Moreover, the manufacturer may be unwilling to provide a variety of different models of microscopes because to do so may increase the manufacturer's cost as well as cost to distributors who must stock the various microscope models.

Therefore, there is a need to adapt existing microscopes to enable them, after the fact, to provide increased magnification.

DETAILED DESCRIPTION

Figure 1:
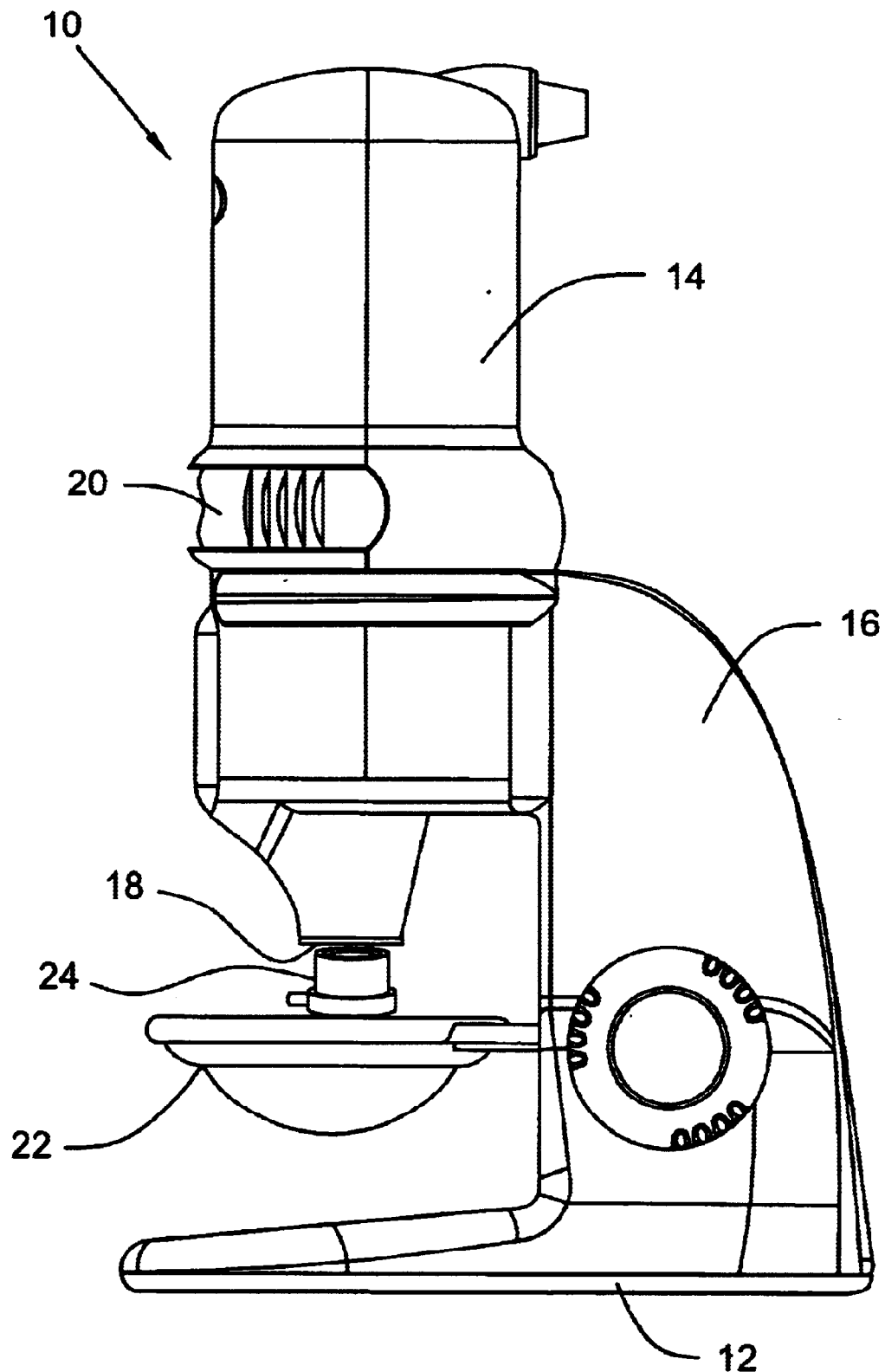
FIG. 1 is a side elevational view of one embodiment of the present invention.

Referring to FIG. 1, a microscope 10 may be amenable to operation with a computer system in accordance with one embodiment of the present invention. That is, the microscope 10 may include a digital imaging sensor (not shown) that digitally captures imaged objects and displays images for example on the display of a computer system. Thus, the microscope 10, in one embodiment of the present invention, may operate like a camera or peripheral to a computer system. However, the present invention is also amenable to conventional microscopes that allow direct viewing of the imaged object through a suitable optical system.

The microscope 10 includes a stand 12, a housing 14, and a specimen holder 22 in one embodiment of the present invention. The stand 12 may include an upstanding portion 16 that connects the stand 12 to the housing 14. Images may be received in the housing 14 through an opening 18 aligned over the specimen holder 22.

In the embodiment illustrated in FIG. 1, no port for direct viewing is provided. Instead, the images may be captured by a digital imaging sensor (not shown) contained within the housing 14. The electronic representations of those images may be transmitted to a tethered computer system (not shown) for display on the monitor associated with that computer system.

A focus knob 23 enables the spacing between the opening 18 and the specimen holder 22 to be mechanically altered to adjust the focus. In addition, the focus of an optical system in the housing 14 may be adjusted through a rotary adjustment device 20.

A booster lens 24 may be positioned directly on the specimen holder 22 below the opening 18 for the optical system contained within the housing 14. The booster lens 24 may include one or more lenses that may significantly increase the magnification possible with only the lenses provided in the housing 14. Thus, users can purchase the booster lens 24 to augment the capabilities of an existing microscope 10. In use, the booster lens 24 may be positioned directly atop a specimen so that no additional focusing may be needed in some embodiments.

Figure 2:
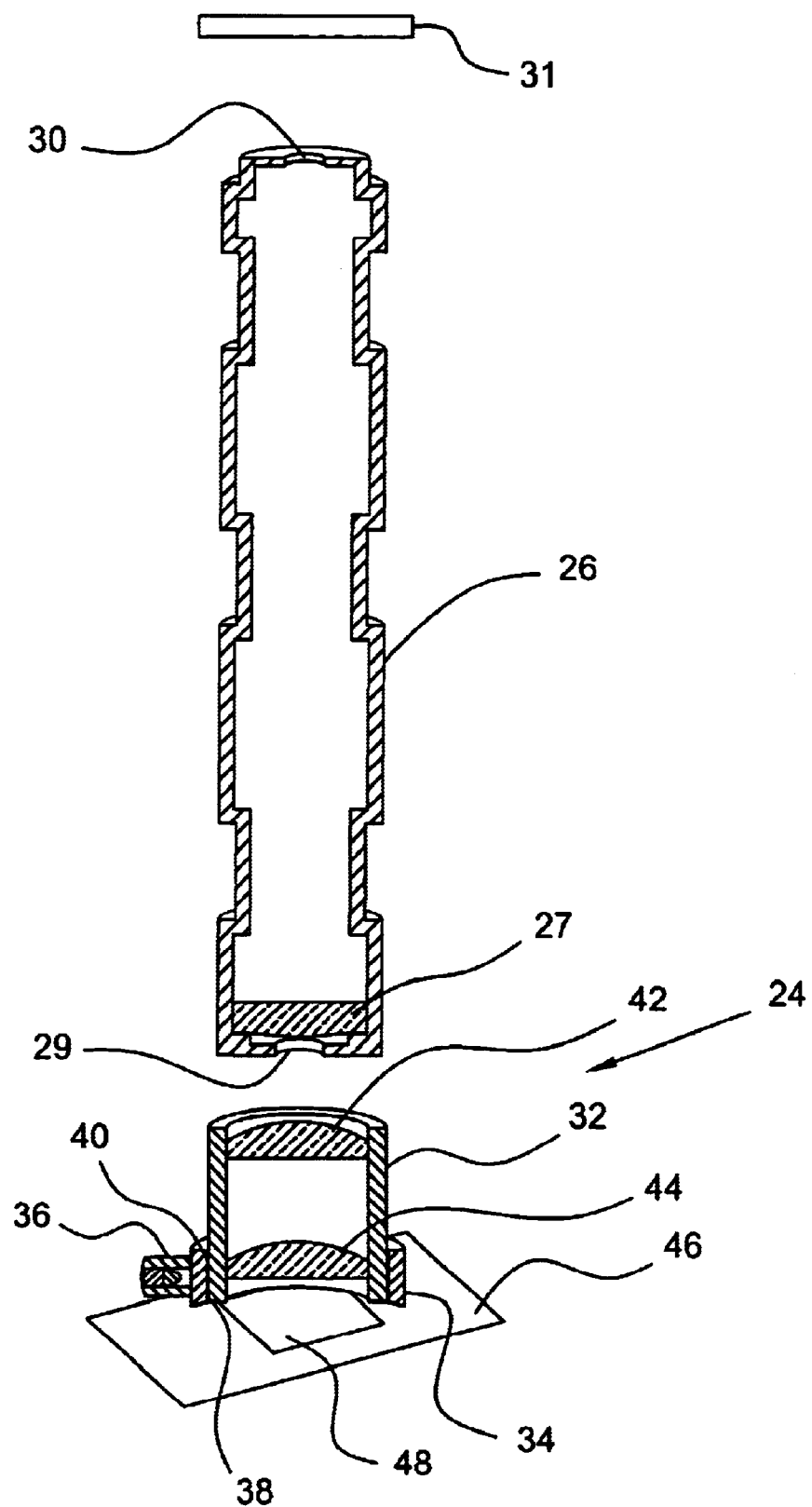
FIG. 2 is a enlarged, partial, vertical cross-sectional view through embodiment shown in FIG. 1.

Referring to FIG. 2, in accordance with one embodiment of the present invention, the housing 14 may include a turret of lens structures 26 of different magnifications. Each lens structure 26 may be selectively alignable with the imaging sensor 31 through an opening 30. In addition, each lens structure 26 may include a magnification lens 27 in an opposite end thereof. Thus, the plurality of lens structures 26 may be mounted for rotation within the housing 14 to selectively align one of the lens structures 26 with a imaging sensor 31 aligned optically with the opening 30.

By positioning the booster lens 24 in alignment with the opening 29 in the system 26, the booster lens 24 may augment the magnification possible with the lens structure 26 lens 27. For example, the booster lens 24 may include a cylindrical housing 32 that threadedly engages a telescoping ring 34 on its lower exterior edge. Thus, the position of a pair of lenses 42 and 44 within the housing 32 may be adjusted relative to the specimen 48 captured on a slide 46. For example, the height of the lens 24 may be adjusted by rotating the ring 34 relative to the rest of the housing 32.

By making the housing 32 transparent, light may be supplied through the housing 32 from a light source 36. The light source 36 may be coupled to an electrical power outlet or may be battery powered.

Advantageously, in some embodiments the booster lens 24 is a completely separate standalone device that may be purchased and simply positioned on the specimen holder 22 to provide added magnification. A limited degree of focusing may be achieved by adjusting the threaded engagement between the ring 34 which sits on the slide 46 and the rest of the housing 32.

The lenses 42 and 44 may be plano convex lenses in accordance with one embodiment of the present invention. However, other lens systems may be utilized to provide additional magnification.

Thus, in some embodiments, additional magnification may be achieved through a standalone device that need not be purchased by all purchasers of the microscope 10. Moreover, in some embodiments no changes are needed to the overall microscope 10 thereby reducing the manufacturer's overhead. Since only limited or no additional focusing may be used in some embodiments because the booster lens 24 is positioned directly on the specimen 48, lower cost may be achieved.

The booster lens 24 may be utilized with a variety of different microscopes including the Intel® Play QX3 microscope by Intel Corporation, Santa Clara, Calif. In one embodiment of the present invention, the light source 36 may plug into the electrical system of the Intel® Play QX3 microscope.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

providing a magnifying lens for a microscope, said magnifying lens free of any physical connection of the microscope while augmenting the magnification of said microscope;

enabling said magnifying lens to be positioned on a specimen holder of said microscope to increase the magnification of said microscope; and causing light to pass through the housing of said magnifying lens.

2. The method of claim 1 including enabling said magnifying lens to be utilized without requiring additional focusing of said microscope.

3. The method of claim 1 including enabling the position of said magnifying lens to be adjusted relative to said specimen holder.

* * * * *